United States Patent Office 2,756,388
Patented July 24, 1956

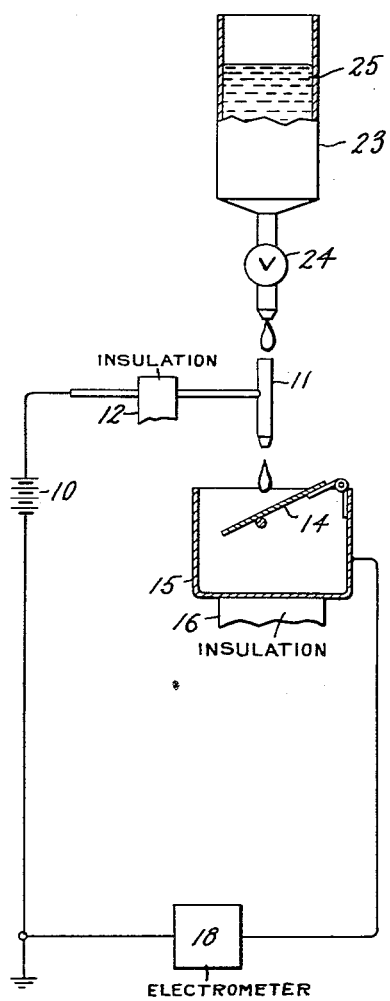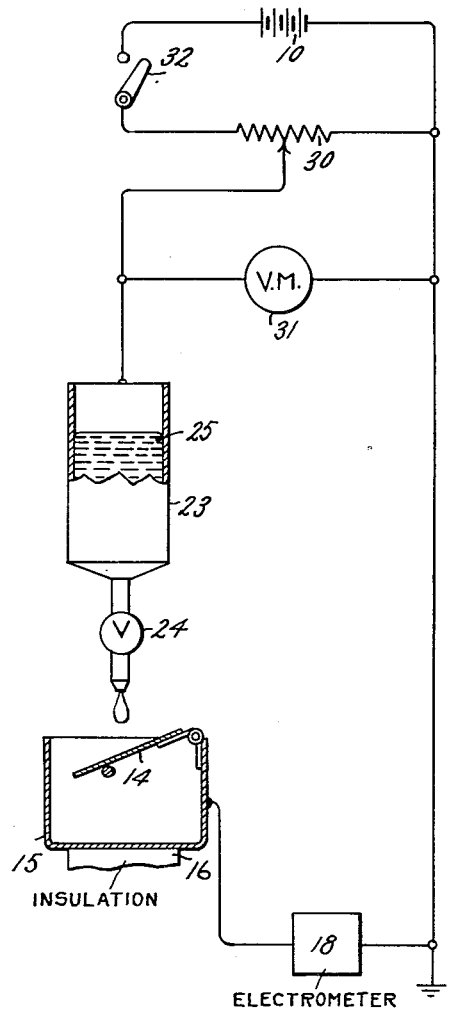

2,756,388

METHOD AND APPARATUS FOR MEASURING CHARGES ON LIQUIDS

Harold T. McLean, Troy, N. Y., assignor to General Electric Company, a corporation of New York Application December 11, 1952, Serial No. 325,475

9 Claims. (Cl. 324—71)

This invention relates to an apparatus and method for determining the magnitude of charge on a charged drop of liquid. More particularly, the invention relates to apparatus which first charges a falling drop of liquid and then measures the charge given up by the drop upon contacting a metal plate.

It has been discovered that a drop of liquid subjected to a direct-current field will become charged in accordance with the voltage of the charging source and the nature of the liquid itself. It has further been discovered that the charge given up by the charged drop to a metal surface depends upon the nature of the liquid itself. It has been discovered that a particular liquid can undergo deteriorative changes with the passage of time and that these changes will be reflected in a change in charge capacity. An instrument which will measure the charge capacity of a drop of charged liquid can serve as a means for readily and quickly determining the condition of the liquid.

Accordingly, it is an object of this invention to provide a device which will measure the magnitude of charge on a drop of liquid.

Another object of the invention is to provide an apparatus for charging a liquid and then discharging the charge under conditions where the magnitude of charge present on the drop may be measured.

Briefly stated, in accordance with one aspect of this invention, a conductive surface is disposed to catch drops of falling charged liquid. A discharge circuit connected to the conducting surface includes a sensitive electrometer. The conducting surface, upon being struck by a charged droplet, actuates the sensitive electrometer to show the magnitude of charge.

Fig. 1 of the drawing shows in diagrammatic form one embodiment of this invention.

Fig. 2 illustrates an alternative embodiment.

Referring to Fig. 1 of the drawing, a source of direct current 10 may be in the form of a battery. The apparatus is operable over a wide range of voltages, as little as one volt being satisfactory for some tests and over a thousand being desirable in other instances. One terminal of the direct current source 10 is connected through a potentiometer 30 to a metal reservoir or burette 23. The other terminal of the direct current source 10 may be connected to ground.

The burette or reservoir 23 contains a test liquid 25 which may be dropped onto a plate 14 positioned in a cup 15 under control of a valve 24. A discharge circuit for the sump cup 15 extends through a sensitive electrometer 18. Charging potential is read from a voltmeter 31.

In operating the embodiment illustrated in Fig. 1, I have found that a standard 62½ volt battery is satisfactory as the power source 10. With the charging circuit closed I allow about 25 drops of test liquid 25 to fall upon the receiver plate 14 over a period of about 25 seconds. I then read the scale deflection of the meter 18.

The embodiment of Fig. 2 is similar to the embodiment of Fig. 1 except that the reservoir 25 is not a part of the charging circuit. In this embodiment one terminal of the power source 10 is connected to an electrode 11 positioned on an insulating block 12. The other terminal is connected to ground.

The electrode 11 has an elongated axis positioned in the vertical plane and is preferably provided with a point at its downwardly disposed end. This point is positioned above a conducting surface 14 disposed in a plane inclined slightly downwardly from the horizontal and mounted at the upper edge of a metal cup 15 mounted on an insulator block 16.

The electrometer 18 may be of any very sensitive type readily available on the market suitable for the measurement of extremely small direct current voltages. An electrometer employing a vacuum tube circuit and having an input resistance greater than $10^{14}$ ohms, a capacitance of about 6 micromicrofarads and capable of detecting D. C. voltages from 0 to 20 volts will be satisfactory, provided its grid drift is less than 0.002 volt per hour and its sensitivity and linearity errors are less than 2% of the full scale reading.

In the operation of the device illustrated in Fig. 2, the valve 24 is adjusted so that a drop of liquid falls onto the electrode 11 at short intervals, e. g. 1 drop per second. The electrode 11 imparts a charge to the liquid which then drops onto the receiver plate 14. Further operation is the same as that described with reference to Fig. 1.

The device of this invention has found use in measuring the degree of deterioration of a liquid. It is particularly suitable for measuring the oxidative deterioration of oils but is satisfactory with organic liquids of all descriptions such as alcohols, aldehydes, ketones, esters and acid, base, or salt solutions. I have tested a number of liquids in my apparatus and have found a deflection factor of 30 to 1 electrometer scale divisions from an equal number of drips of two liquids in different stages of oxidative deterioration.

While the present invention has been described by reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. An instrument for measuring the charge on a drop of liquid comprising means engageable by a falling drop of liquid to place an electric charge on said drop, a conducting surface spaced from said electric charging means and engageable by said drop of liquid after it has been charged, a sensitive charge measuring meter, and a circuit connecting said conducting surface to ground through said meter whereby the charge on said drop of liquid is measured by said meter.

2. An instrument for measuring the magnitude of charge of a charged liquid drop comprising a conducting surface, means for introducing liquid drop to said surface, means for placing a static charge on said liquid drop, a sensitive charge measuring meter, and a circuit connecting said conducting surface to ground through said meter whereby the charge on said liquid drop is measured by said meter.

3. An instrument for measuring the magnitude of charge of a charged liquid comprising a liquid reservoir, means for charging liquid in said reservoir, means for issuing charged liquid from said reservoir a drop at a time, a conducting surface engageable by said drop of liquid after it has been charged, a sensitive charge measuring meter, and a circuit connecting said conducting surface to ground through said meter whereby the charge on said liquid is measured by said meter.

4. An instrument for measuring the charge on drops of liquid comprising means for releasing liquid a drop at a time, means engageable by said drops of liquid for placing a static charge thereon, a conducting surface engageable by said drops, a sensitive charge measuring meter, and a circuit connecting said conducting surface to ground through said meter whereby the charge on said drops of liquid is measured by said meter.

5. An instrument for measuring the charge on a drop of liquid comprising: a source of direct current, a conducting surface, an electrode positioned above said surface out of electrical contact therewith, and a sensitive charge measuring meter; a circuit connecting said electrode to said conducting surface through said direct current source and charge measuring meter; and means for passing drops of liquid over said electrode onto said conducting surface whereby said electrode charges the liquid passing thereover and the resulting charge is discharged through said charge measuring meter when said liquid strikes said conducting surface.

6. A charge measuring instrument as claimed in claim 5, wherein the electrode is of elongated vertical configuration terminating in a point whereby liquid has an easy exit in drop form from said point onto said conducting surface.

7. A charge measuring instrument as claimed in claim 5, wherein the conducting surface is of metal having a tilt from the horizontal whereby liquid falling onto said surface drains off.

8. An instrument for measuring the charge on a drop of liquid comprising a source of direct current, means utilizing said source of direct current for charging a drop of liquid, a conducting surface engageable by a drop of charged liquid, and a discharge circuit for said conducting surface, said discharge circuit including means for measuring the charge on said drop of liquid.

9. The method of determining the charge capacity of a drop of liquid which comprises applying an electric charge to a drop of liquid, catching said drop on a conducting surface, and discharging said conducting surface through a sensitive charge measuring meter.

References Cited in the file of this patent

UNITED STATES PATENTS

| | | |
|---|---|---|
| 1,070,556 | Strong | Aug. 19, 1913 |
| 1,168,227 | Schmidt | Jan. 11, 1916 |
| 1,958,406 | Darrah | May 15, 1934 |
| 2,166,385 | Wintermute | July 18, 1939 |
| 2,315,805 | Mayo et al. | Apr. 6, 1943 |
| 2,491,445 | Cunningham et al. | Dec. 13, 1949 |
| 2,578,697 | Gunn | Dec. 18, 1951 |
| 2,671,200 | Lederer | Mar. 2, 1954 |